US011797401B2

United States Patent
Said et al.

(10) Patent No.: US 11,797,401 B2
(45) Date of Patent: Oct. 24, 2023

(54) TRUE ZERO RTO: PLANNED FAILOVER

(71) Applicant: EMC IP Holding Company LLC, Hopkinton, MA (US)

(72) Inventors: Jawad Said, Kfar Yasif (IL); Kfir Wolfson, Beer Sheva (IL); Jehuda Shemer, Kfar Saba (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 178 days.

(21) Appl. No.: 16/910,694

(22) Filed: Jun. 24, 2020

(65) Prior Publication Data
US 2021/0406139 A1  Dec. 30, 2021

(51) Int. Cl.
*G06F 11/20* (2006.01)
*G06F 11/14* (2006.01)
*G06F 9/455* (2018.01)

(52) U.S. Cl.
CPC ...... *G06F 11/2028* (2013.01); *G06F 11/1464* (2013.01); *G06F 11/1469* (2013.01); *G06F 11/1484* (2013.01); *G06F 2009/45575* (2013.01); *G06F 2009/45595* (2013.01)

(58) Field of Classification Search
CPC ............. G06F 11/1464; G06F 11/1469; G06F 11/1484; G06F 11/2028; G06F 11/203; G06F 9/4856; G06F 2009/4557; G06F 2009/45575; G06F 2009/45595
See application file for complete search history.

(56) References Cited

U.S. PATENT DOCUMENTS

| | | | |
|---|---|---|---|
| 2008/0222375 A1* | 9/2008 | Kotsovinos | G06F 9/5083 709/230 |
| 2009/0007106 A1* | 1/2009 | Araujo, Jr. | G06F 9/45558 718/1 |
| 2012/0054367 A1* | 3/2012 | Ramakrishnan | G06F 9/4856 718/1 |
| 2017/0199755 A1* | 7/2017 | Voccio | G06F 3/0664 |
| 2020/0073647 A1 | 3/2020 | Takabayashi | |

OTHER PUBLICATIONS

T. Wood et al., "CloudNet: Dynamic Pooling of Cloud Resources by Live WAN Migration of Virtual Machines," in IEEE/ACM Transactions on Networking, vol. 23, No. 5, pp. 1568-1583, Oct. 2015, doi: 10.1109/TNET.2014.2343945. (Year: 2015).*

Bogdan Nicolae and Franck Cappello. 2012. A hybrid local storage transfer scheme for live migration of I/O intensive workloads. In Proceedings of the 21st international symposium on High-Performance Parallel and Distributed Computing (HPDC '12). Association for Computing Machinery (Year: 2012).*

(Continued)

*Primary Examiner* — Bryce P Bonzo
*Assistant Examiner* — Albert Li
(74) *Attorney, Agent, or Firm* — Workman Nydegger (57) ABSTRACT

One example method includes performing, as part a planned failover procedure, operations that include connecting a replica OS disk to a replica VM, powering up the replica VM, booting an OS of the replica VM, disconnecting a source VM from a network, and connecting replica data disks to the replica VM. IOs issued by an application at the source VM continue to be processed by the source VM while the replica OS disk is connected, the replica VM is powered up, and the OS of the replica VM is booted.

18 Claims, 6 Drawing Sheets

(56) References Cited

OTHER PUBLICATIONS

F. Zhang, X. Fu and R. Yahyapour, "CBase: A New Paradigm for Fast Virtual Machine Migration across Data Centers," 2017 17th IEEE/ACM International Symposium on Cluster, Cloud and Grid Computing (CCGRID), Madrid, Spain, 2017, pp. 284-293, doi: 10.1109/CCGRID.2017.26. (Year: 2017).*
International Search Report and Written Opinion received for PCT Patent Application No. PCT/US21/28959, dated Jul. 21, 2021, 14 pages.

* cited by examiner

FIG. 1

| SOp# | Operation | Approximate Time |
|---|---|---|
| S1 | Stop app and disconnect network | 5 seconds (app dependent) |
| S2 | Flush buffers | <1 second |
| S3 | Transfer left over data to replica side | <1 second |
| S4 | Distribute left data to replica volumes | <1 second |
| S5 | Configure VM hardware | 1 second |
| S6 | Connect VM NICs to network | 1 second |
| S7 | Power up replica VM | 20 seconds |
| S8 | Boot the OS | 3 minutes |
| S9 | Re-IP and other orchestrations | 20 seconds |
| S10 | Run the app | 5 seconds (app dependent) |

| Op# | SOp# | Operation | Approximate Time |
|---|---|---|---|
| N1 |  | Connect replica OS disk to the VM | 1 second |
| N2 | S5 | Configure VM hardware | 1 second |
| N3 | S7 | Power up replica VM | 20 seconds |
| N4 | S8 | Boot the OS | 3 minutes |
| N5 | S9 | Re-IP and other orchestrations | 20 seconds |
| N6 | S1 | Stop app and disconnect network | 5 seconds (app dependent)* |
| N7 | S2 | Flush buffers | <1 second* |
| N8 | S3 | Transfer left over data to replica side | <1 second* |
| N9 | S4 | Distribute left data to replica volumes | <1 second* |
| N10 | S6 | Connect VM NICs to network | 1 second* |
| N11 |  | Connect data disks to VM | 1 second* |
| N12 | S10 | Run the app | 5 seconds (app dependent)* |

TRUE ZERO RTO: PLANNED FAILOVER

FIELD OF THE INVENTION

Embodiments of the present invention generally relate to data backup and recovery operations. More particularly, at least some embodiments of the invention relate to systems, hardware, software, computer-readable media, and methods for achieving low RTO in planned failover scenarios.

BACKGROUND

Data protection is a crucial practice for any organization. Protecting Virtual Machines (VMs) has become important for organizations using virtualization in their data centers. One parameter that may be referenced in connection with data recovery is the RecoveryTime Objective (RTO), which is the maximum acceptable amount of time for restoring an application and regaining access to data after an unplanned disruption. Thus, organizations may prefer the RTO to be as minimal as possible.

The RTO may be adversely affected by various conditions. For example, the planned failover downtime (RTO) includes VM boot times, which may be relatively long compared to other operations of a recovery and restore process. Further, eliminating OS and app load times, so as to reduce RTO, by constantly running the OS and application on a replica VM may provide good results in some cases, but requires that the replica VM be up and running constantly. Thus, the CPU of the replica VM is always running and, further, management operations may be required to constantly monitor the state at the replica VM. Accordingly, there is a need to reduce, or eliminate, RTO while avoiding the requirement to constantly run and monitor the replica VM.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data backup and recovery processes. More particularly, at least some embodiments of the invention relate to systems, hardware, software, computer-readable media, and methods for achieving low RTO in planned failover scenarios by delaying application stoppage and network disconnection until after relatively slow recovery operations have been completed. Note that as used herein, a 'planned' failover is one that is not, necessarily, performed in response to the actual occurrence, or anticipation, of a problem.

In one example embodiment, a VM at a production site, for example, may be copied to a replication site. In this way, the replica VM is available should any problems be experienced with the production site VM. From time to time, a planned failover may be implemented, such as when the production site VM requires an update. After the planned failover is implemented, network traffic, which may comprise application traffic, directed to the production site VM may instead be directed to the replica VM.

When the planned failover is triggered, the replica OS disk may connected to the replica VM, and the replica OS disk may then be booted up. Before, during, and for some time after, connection of the replica OS disk, replication of application data from the production, or source, VM to the data disk(s) of the replica VM may be ongoing, although at the same time, IOs from the source OS disk intended for the replica OS disk may be ignored, that is, not written to the replica OS disk. After the replica VM OS is booted, the failover may be orchestrated, and the replica data disks connected to the replica VM. Since the replica VM is already running, the RTO in this planned failover scenario may be minimal. Orchestration of the failover may involve, for example, stopping the application at the source VM, and disconnecting the source VM from the network.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a planned failover may be implemented without requiring the constant overhead of managing the app on the remote. One embodiment operates to delay stopping of the source VM application, and network disconnection, until after one or more relatively slow processes of a failover have been performed. In one embodiment, IOs continue to be processed at the source VM, and replicated from the source VM to the replica VM, until the application at the source VM is stopped. In one embodiment, the downtime between disconnection of the source VM and running the application on the replica VM may be less than about 15 seconds. In one embodiment, the replica VM OS disk may be booted before the source VM is disconnected from the network. In one embodiment, an OS disk separation process may be used to boot the OS disk of the replica VM before the source VM is disconnected from the network. In one embodiment, an RTO of a system may be reduced based on the implementation of a particular order of performance of the processes that make up the failover procedure.

Note that as used herein, the processing of IOs (Input/Output operations) includes, but is not limited to, receiving IOs from an application and writing the IOs to a local data disk, such as a data disk of a VM. The application may be running on the VM, although that is not necessarily required. The IOs may comprise, for example, read, write, and/or, delete, operations. The processing of the IOs may be performed in whole, or in part, at the VM. After the IOs are processed at the VM, the changes to the data disk(s) may be replicated to data disk(s) of a replica VM.

A. Aspects of Example Operating Environments

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation processes including, but not limited to, failover operations including planned failover operations, data replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC RecoverPoint for Virtual Machines (RP4VM) platform and associated backup software, and storage environments such as the Dell-EMC DataDomain storage environment. In general however, the scope of the invention is not limited to any particular any point-in-time (PIT) backup platform or data replication platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, Dell-EMC Cloud, Microsoft Azure, Amazon AWS, and Google Cloud. More generally however, the scope of the invention is not limited to employment of any particular type or implementation of cloud storage.

In addition to the storage environment, the operating environment may also include one or more clients that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, incremental or differential backups, and any PIT backups and replications.

B. Overview

As noted elsewhere herein, an enterprise may wish to minimize RTO as much as possible. One example recovery procedure may include several processes, which may be performed in one or more particular sequences. The cumulative effect on RTO of these processes may be significant. This example recovery procedure may comprise:

1. Disk rolling time
    a. Restore the replica disk to the chosen point in time (PIT).
    b. It may take a short time (a few seconds) in case the user chose latest image.

2. Hardware configuration
   a. Before powering up the replica VM, the replication system brings the hardware to the required configuration according to the production VM
   b. Hardware examples: CPU, Memory, Network, etc.
   c. It may take 10s of seconds, depending on virtualization infrastructure response time.
3. POST (Power-On Self-Test)
   POST is a diagnostic testing sequence that a computer may run to determine if the computer hardware is working correctly.
4. OS boot time
   OS may take several minutes depending on OS type, drivers, and hardware.
5. Network discovery and connection
   Network discovery and connection may take several seconds.
6. Login
   User login for AD for example, may take several seconds.
7. App start time
   App may take 10s of seconds to startup.

Figure 1:
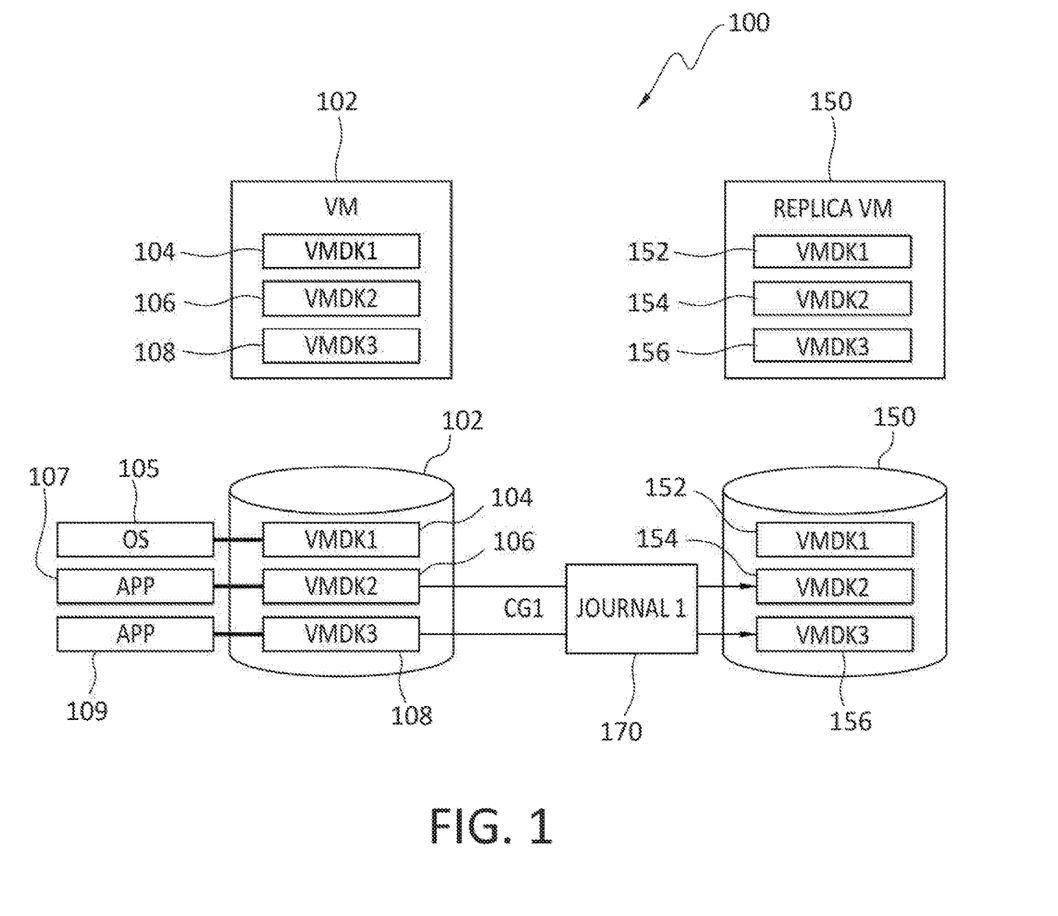
FIG. 1 discloses aspects of an example replication configuration that may be employed with an embodiment of the invention.

At least some embodiments of the invention may be implemented in connection with a configuration such as the example configuration 100 disclosed in FIG. 1. In the example of FIG. 1, the configuration 100 comprises a VM 102, such as a source or production VM for example, that includes one or more disks, for example, OS disk VMDK1 104, data disk VMDK2 106, and data disk VMDK3 108. In the example of FIG. 1, VMDK1 104 is the OS disk and as such, contains the OS 105 for the VM 102, and VMDK2 106 and VMDK3 108 are data disks that may respectively contain, for example, application data 107 and 109 associated with one or more applications of the VM 102. The executable applications 107 and 109 may reside on either VMDK1 104, that is, the OS disk, or on one or more of VMDK2 106 and VMDK3 108, that is, the data disks. One or both of the data disks VMDK2 106 and VMDK3 108 may comprise, for example, a respective file system, or the one or both of the VMDK2 106 and VMDK3 108 data disks may be raw block devices, depending upon the requirements of the VM 102 applications.

With continued reference to FIG. 1, a replica VM 150 is provided that includes a set of disks, where the disks respectively correspond to OS disk VMDK1 104, data disk VMDK2 106, and data disk VMDK3 108 of the source or production VM 102. Particularly, the replica VM 150 includes an OS disk VMDK1 152, data disk VMDK2 154, and data disk VMDK3 156. In general, IOs involving application data 107 and/or 109 of the source VM 102 may be replicated to, respectively, data disk VMDK2 154, and data disk VMDK3 156, of replica VM 150. These IO replication transactions may be captured in a replication journal 170, although that is not required. The replication journal 170 may include a history of IOs written to the data disks of the replica VM 150, and when those IOs were written.

It is noted that while the example of FIG. 1 includes source and replica VMs 102 and 150, respectively, that comprise multiple disks, VMs with only a single disk may be re-configured for employment in connection with embodiments of the invention. For example, a single disk VM may be modified by adding a second disk to the single disk VM, formatting the added disk with a file system, and setting the application data source to reside on the second disk. If needed, a replica VM of the source VM that initially had the single disk configuration may be similarly modified in the event that the replica VM was initially configured with only a single disk.

With continued reference to the example of FIG. 1, a single OS disk 104, 152, respectively, may be provided for the source VM 102 and the replica VM 150. In general, the OS and the applications may collectively reside on a predefined fixed number of disks. The disk holding the OS may be defined or tagged as such by the user. Alternatively, the user may define or tag the application disks as such. In some embodiments, a source VM and/or replica VM may each have multiple OS disks.

In one approach to the use of the configuration 100, an RTO reduction might be achieved by constantly running the OS disk 152, and configuring the replication operations to only update the data disks 154 and 156. Once a failover is initiated, the OS, and possibly the application as well, may already be running, and the data disks 154 and 156 may be exposed immediately, which may save on boot time and initialization. While such an approach may be useful in some circumstances, it may not always be desirable for the OS disk 152 to be running constantly. Thus, and as disclosed elsewhere herein, other approaches to the use of the configuration 100 may be employed instead.

In connection with FIG. 1, it is noted that some examples of a planned failover may have two primary sources, or causes, for delays that may contribute to an increased RTO. Such delays may stem, for example, from the amount of time that it may take to ensure that all production data reaches the replica VM 150 (zero RPO), and from the amount of time that it may take to orchestrate and power up the replica VM 150.

One possible procedure for ensuring all data reaches the replica VM 150 in a consistent state may be to stop the application 107/109 and source VM 102, disconnect the network, so as to avoid generating new data, and then flushing all file system buffers to ensure data reaches the target. These may be relatively fast operations that take only a few seconds. Once data reaches the replica VM 150, the replica VM 150 may be powered up, booted, and IP address, network and other operations may be applied. These may be more costly processes, in terms of time, and may take several minutes, as described elsewhere herein. In this example, the flushing of file system buffers may start immediately after the data reaches the replica VM 150. The total down time, in this example, may be measured as the time from the moment the application 107/109 is stopped, until the moment that the application 107/109 is accessible on the replica VM 150.

C. Failover Operations

Figure 2:
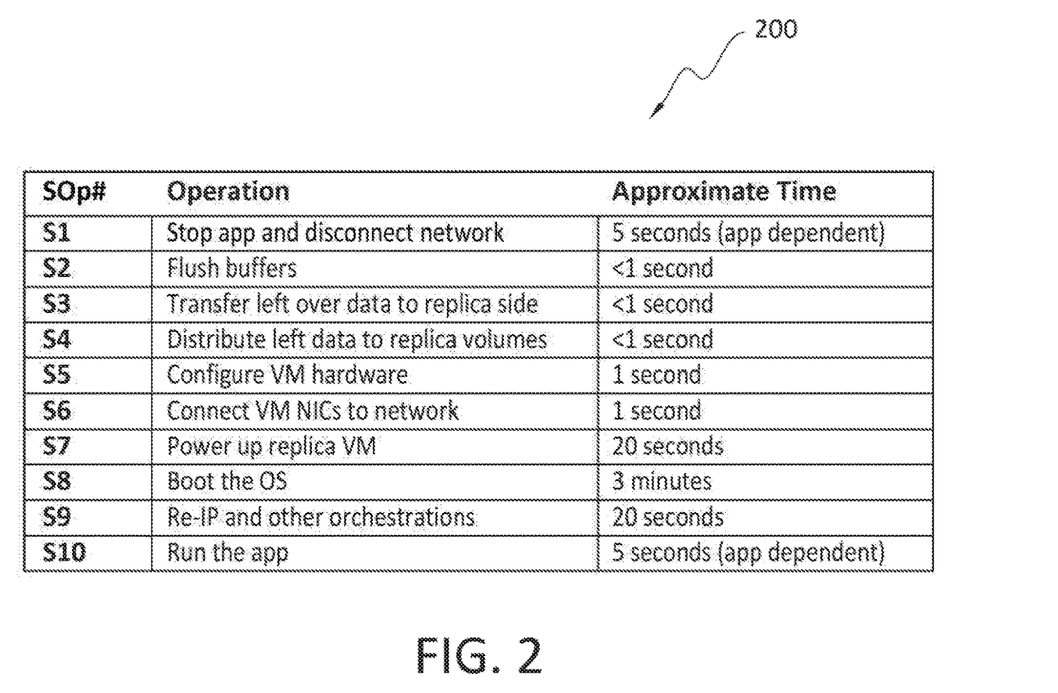
FIG. 2 discloses aspects of a comparative example of a failover process.
Figure 3:
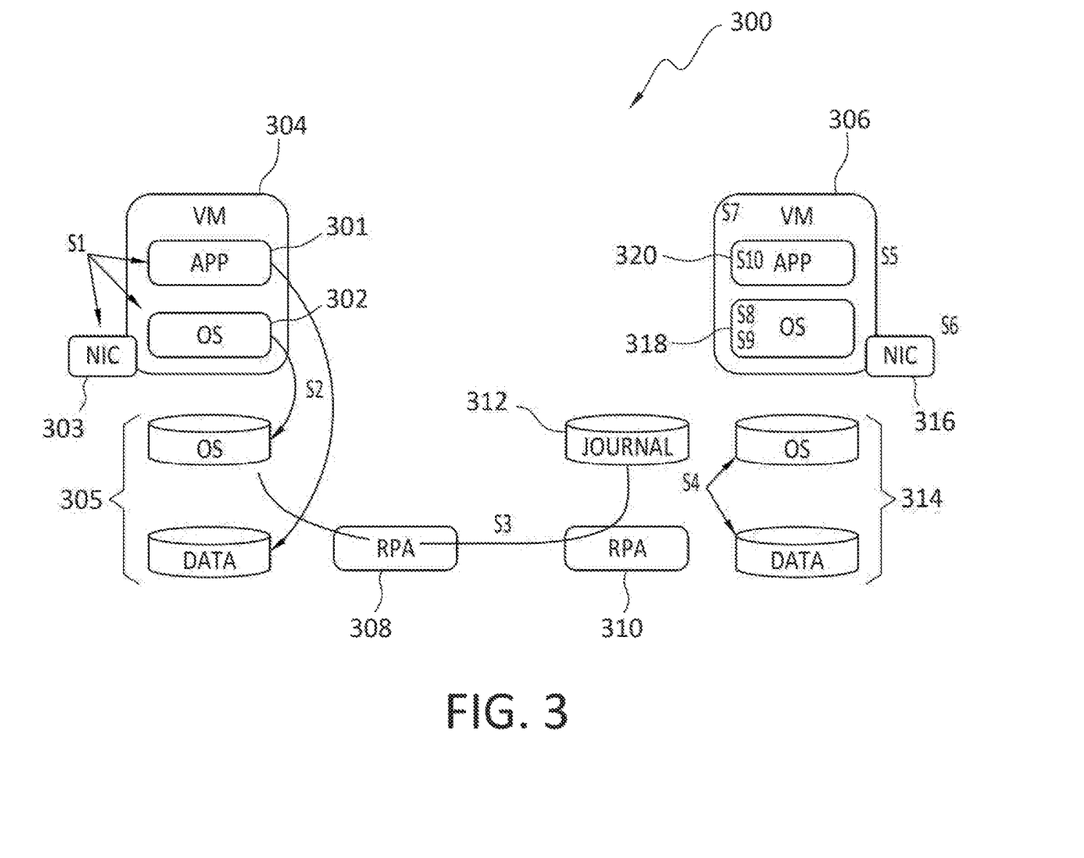
FIG. 3 discloses aspects of an example replication configuration in connection with which the failover process of FIG. 2 may be performed.

In order to better illustrate aspects of some example embodiments, a comparative example is presented in FIGS. 2 and 3. In general, FIG. 2 discloses an example failover scheme 200 that could be employed in a planned failover process such as may be performed in connection with the example configuration 300 of FIG. 3. In FIG. 2, it can be seen that the downtime is calculated from the time of S1 to the time of S10 and totals about 4 minutes. As well, a number of the longer processes, such as S7, S8, and S9, with a cumulative time of about 3:40, are bunched together near the end of the sequence, and are performed after the application has been stopped and the source VM disconnected from the network (S1). The performance of these relatively longer processes after S1 contributes significantly, in this comparative example, to the relatively long RTO of about 4 minutes.

With continued reference to FIGS. 2 and 3, the failover operation may be successfully completed so long as certain procedures are observed. First, the network on the production side should be disconnected before the replica side is powered up and connected to the network or Re-IP applied. In other words, the two sides cannot be both running and connected to the network in parallel.

Also, the OS disks may be handled separately from the data disks. During a planned failover, steps may be taken to ensure there are no upgrades or configuration changes on the replica OS disk. Note that there may be IOs on the source OS disk, due to logs for example, but nothing that compromises the OS integrity. Such IOs may be ignored during the distribution (S4), as the replica OS disk is already running. These IOs may be reconciled later by copying logs and updating the replica OS disk to reflect the logged operations.

Finally, if there is journal distribution lag, that is, the distribution of journal data to the replica VM data disks cannot keep up with the data that is being replicated from the source VM, the lag should be resolved prior to initiating the failover. This may help to minimize the time needed for S4 since there may be little, or no, leftover data if the journal at the replica VM is up to date.

With the foregoing points in view, a comparative failover method performed in conjunction with the configuration 300 may proceed as outlined hereafter. As shown in FIG. 3, and with continued attention to FIG. 2, the failover method may begin at S1 when the application 301 is stopped and the NIC (Network Interface Controller) 303 of the source VM 304 disconnects the source VM 304 from the network. Note that although data in the buffers at the source VM 304 may still be transmitted, as discussed below, the source VM 304 is unable to process any further IOs from the application 301 after it is disconnected from the network.

At S2, any remaining data in the file system buffers of the VM may be flushed from the application 301 and OS 302 to the source volumes 305, and then transferred at S3 to the replica VM 306. In this way, the replica VM 306 is brought to a state where it is consistent with the source VM 304.

The process S3 may involve the use of a source replication appliance 308 (RA), one example of which is the DellEMC RPA (Recover Point Appliance) and a target RA 310. As used herein, an RA embraces, but is not limited to, a physical or virtual machine that is operable to transfer replication data from one site to another, such as from a production site to a recovery site for example. The IOs to which the data pertains may be recorded in a journal 312, and the IOs then written at S4 to the replica volumes 314.

At S5, the hardware of the replica VM 306 may be configured, and the NIC 316 of the replica VM 306 connected to the network at S6. At S7-S8, the replica VM 306 may be powered up, and the OS 318 booted. Next, a re-IP and orchestration processes are performed at S9. The re-IP process may involve, for example, setting a new IP address and/or network configuration for the replica VM 306. Finally, at S10, the application 320 at the replica VM 306 may be started. At this point, the failover from the source VM 304 to the replica VM 306 may be considered as complete, and the replica VM may begin to service IOs from the application 320.

Figure 4:
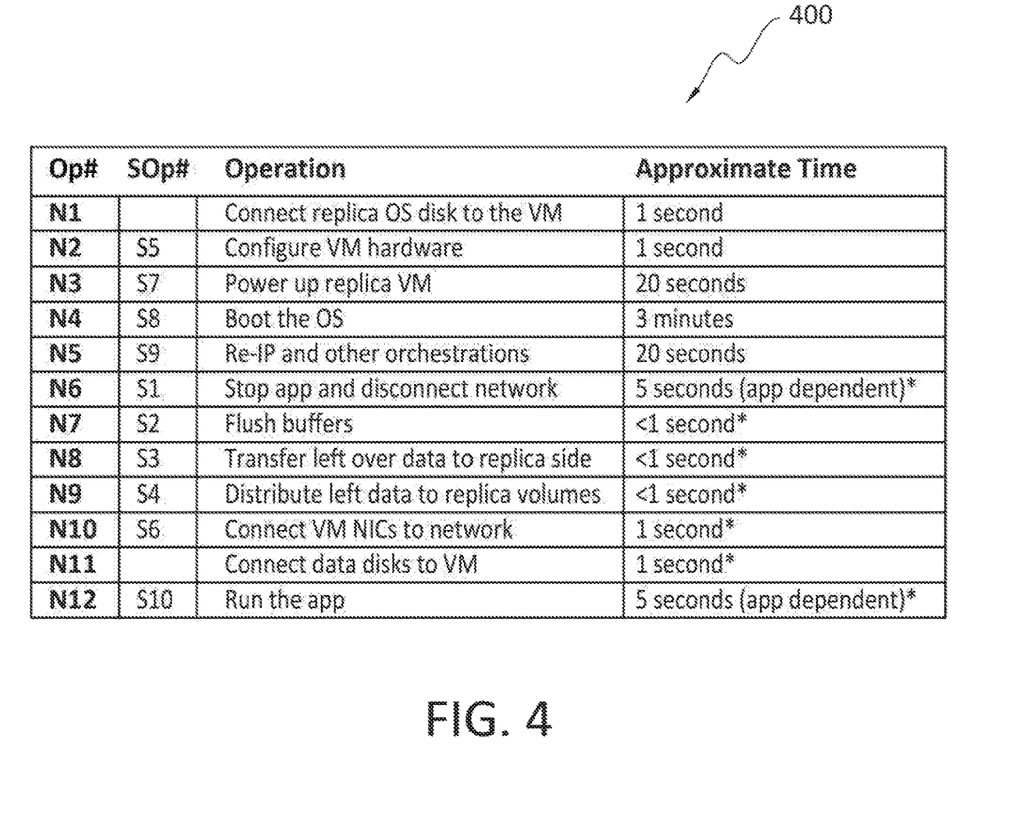
FIG. 4 discloses aspects of an example embodiment of a failover process.
Figure 5:
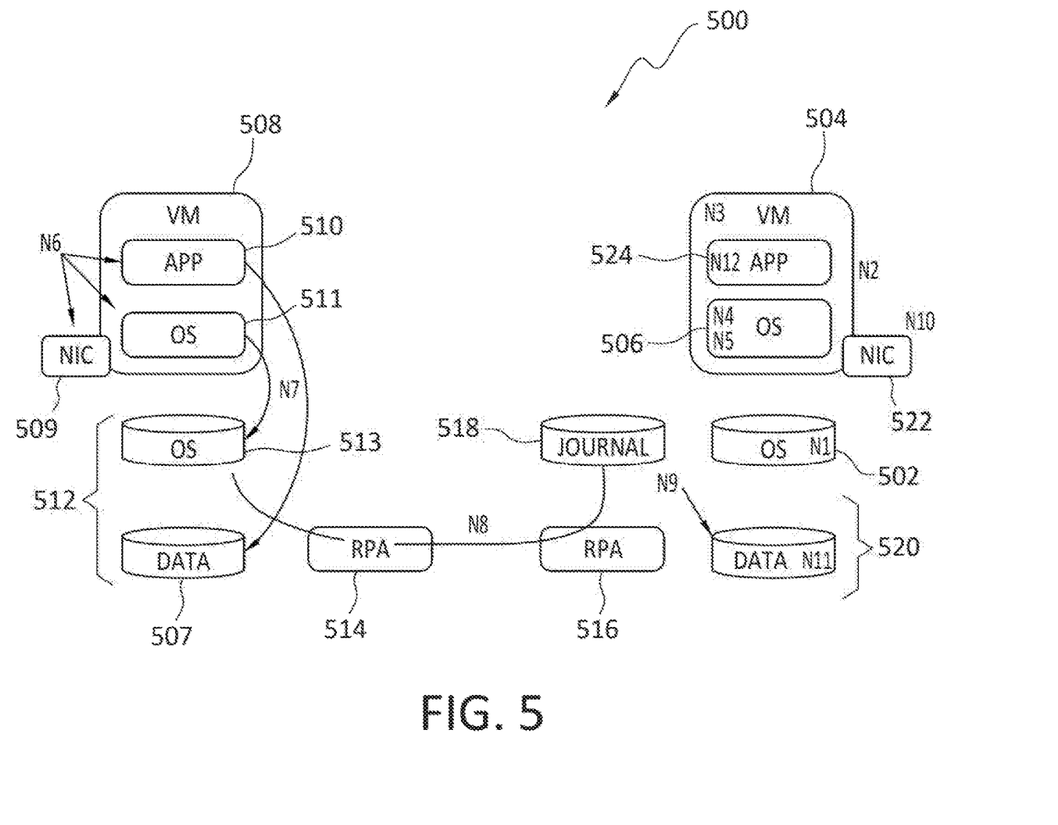
FIG. 5 discloses aspects of an example replication configuration in connection with which the failover process of FIG. 4 may be performed.

With the comparative example of FIGS. 2 and 3 in view, attention is directed now to FIGS. 4 and 5 which disclose aspects of an example embodiment of the invention. In general, the scheme disclosed in FIGS. 4 and 5 may provide for an order of failover operations that is enabled by the separation of the handling of the OS disk from the handling of the data disks. The example failover process of FIGS. 4 and 5 may involve different, more, and/or fewer, operations than indicated in the example of FIGS. 2 and 3, as shown in the comparison in FIG. 4 between 'Op #' for the order of operations (denoted as 'Nx') in the example embodiment, and the 'SOp #' for the order of operations (denoted as 'Sx') in the comparative example of FIG. 2. As well, the order of the operations in FIGS. 4 and 5 may be different from the order indicated in the comparative example of FIG. 2.

To illustrate, in the example of FIGS. 4 and 5, and as discussed in more detail below, the replica OS disk may be connected to the replica VM while IO distribution continues from the source volume to the replica volume, that is, the replica data disk(s). During this time, at least, IOs intended for the production OS disk may be ignored, as explained elsewhere herein. After connection of the replica OS disk to the replica VM, all operations that can be performed without fully connecting the network and/or taking down the production may now occur, although disconnection from the network may not yet have been implemented. Note that N10 (S6 in FIG. 2) may be triggered in parallel at any time after N6 (S1 in FIG. 2), but N10 is a very fast operation, taking only about 1 second to perform, in the example of FIG. 4.

With continued reference to FIG. 4, it is noted in the example failover scheme 400 that relatively time-consuming operations, such as power up (N3, 20 seconds) and boot (N4, 3 minutes), may be completed before the production VM is interrupted by being disconnected (N6) from the network. In this way, replication from the production VM to the source VM may continue while operations such as N3 and N4, for example, are performed. Because the relatively time consuming operations may be partly, or fully, completed before N6, the failover from the source VM to the replica VM that takes place after N6, may be performed relatively quickly. For example, the down time, measured as the time between when the source VM is disconnected (N6) and the replica VM is connected (N10), may be minimized by retaining only select operations, such as the short flush (N7) and leftover transfer operations (N8), for performance after disconnection (N6). Example operations that may be deferred until, or after, performance of N6 are denoted with an '*' in FIG. 4. Thus, in the illustrated example, the downtime may be less than about 15 seconds, that is, the time it takes to flush (N7), transfer (N8), and distribute (N9), the residual data of the source VM.

By way of comparison then, the downtime of about 4 minutes (240 seconds) of the failover scheme 200 of FIG. 2 is about 16× greater than the downtime of about 15 seconds of the failover scheme 400 of FIG. 4. In computing environments where a time savings of seconds, or even ms (milliseconds), may be important, the example failover scheme 500 may constitute a significant improvement relative to the comparative failover scheme 300.

With particular reference now to FIG. 5, and continuing reference to FIG. 4, the failover method may begin at N1 when the replica OS disk 502 is connected to the replica VM 504. At N2, the replica VM 504 hardware may be configured, and the replica VM 504 powered up at N3. Next, the OS 506 of the replica VM 504 may be booted at N4. A final process of re-IP and orchestrations, N5, may be performed before the source VM 508 is disconnected from the network.

It is noted that, as shown in FIGS. 4 and 5, one, some, or all, of the relatively slower failover processes may be performed prior to disconnection of the source VM 508 from the network N6. Until such disconnection is performed at N6, the source VM 508 may continue to process, and replicate to the replica VM 504, IOs issued by the application 510. In the illustrative example of FIGS. 4 and 5, the amount of time elapsed between N1 and N5 may be about 3:42, during which time IOs may continue to be processed and replicated.

Note that the order in which the processes in FIGS. 4 and 5 such as, but not limited to, N1 through N5, are performed, may be varied. Moreover, one or more of the processes in FIG. 5 may be omitted in some circumstances. In general, the processes disclosed in FIGS. 4 and 5 may be ordered in such a way as to minimize the amount of downtime experienced in connection with the operation of the configuration 500. Such process orders may be optimal, or nearly so, given the particular processes that may need to be performed in particular circumstances. For example, in some instances, fewer than all of the processes N1 through N5 may be performed prior to disconnection N6. As well, any process that does not require a network connection may be performed after N6 is completed. Thus, the particular processes, and the order and timing of their performance, disclosed in FIGS. 4 and 5 are presented only by way of example, and are not intended to limit the scope of the invention in any way.

With continued reference now to FIG. 5, after disconnection of the NIC 509 of the source VM 508 from the network at N6, the buffers of the source VM 508, which may include the app 510 and OS 511, may be flushed N7 to the source volume 512 that may include the OS disk 513 and data disk 507, and then transferred N8 by the source RA 514 to the target RA 516.

The IOs to which the transferred N8 data pertains may be recorded in a journal 518, and the IOs then written at N9 to the replica volumes 520. As noted elsewhere herein, IOs written to the source volume 512, particularly the source OS disk 513, may, or may not, be written to the replica OS disk 502.

At N10, the NIC(s) 522 of the replica VM 504 may be connected to the network, and at N11, the data disks of the replica volumes 520 connected to the replica VM 504. The application 524 may then be started N12. At this point, the failover from the source VM 508 to the replica VM 504 may be considered as complete, and the replica VM may begin to service IOs from the application 524.

As illustrated by the examples of FIGS. 4 and 5, embodiments of the invention embrace, among other things, schemes to improve RTO in a planned failover procedure, by breaking the failover procedure into stages and using an OS disk separation process in order to boot the target, or replica, VM before the production, or source, VM is taken down, that is, disconnected from the network. That is, with respect to the OS disk separation, the replica OS is connected to the replica VM separately in time from connection of the replica data disks to the replica VM. In this way, the relatively long OS boot process can be performed at the replica VM while IOs are still being processed by the source VM and replicated to the data disks of the replica VM.

As indicated in FIG. 5, for example, embodiments of a planned failover process may be performed cooperatively by a source VM and a replica VM. A failover procedure may be instantiated by one or the other of the source VM or replica VM, or by another entity such as a backup/restore server for example. In general, the scope of the invention is not limited to performance of a failover procedure, or any of its constituent processes, by any particular entity(ies).

D. Further Example Embodiments

Following are some further example embodiments of the invention. These are presented only by way of example and are not intended to limit the scope of the invention in any way.

Embodiment 1. A method, comprising: as part of a planned failover procedure, performing operations comprising: connecting a replica OS disk to a replica VM; powering up the replica VM; booting an OS of the replica VM; disconnecting a source VM from a network; and connecting replica data disks to the replica VM, wherein IOs issued by an application at the source VM continue to be processed by the source VM while the replica OS disk is connected, the replica VM is powered up, and the OS of the replica VM is booted.

Embodiment 2. The method as recited in embodiment 1, wherein processing of the IOs at the source VM stops when the source VM is disconnected from the network.

Embodiment 3. The method as recited in any of embodiments 1-2, wherein the operations further comprise, after booting the OS and before disconnecting the source VM, setting a new IP address and/or network configuration for the replica VM.

Embodiment 4. The method as recited in any of embodiments 1-3, wherein the operations further comprise, after disconnection of the source VM, flushing a buffer of the source VM and transferring leftover data from a volume of the source VM to a volume of the replica VM.

Embodiment 5. The method as recited in any of embodiments 1-4, wherein the operations further comprise, after disconnection of the source VM and before connecting the replica data disks to the replica VM, connecting the replica VM to the network.

Embodiment 6. The method as recited in any of embodiments 1-5, wherein the operations further comprise running the application at the replica VM after the replica data disks are connected to the replica VM.

Embodiment 7. The method as recited in any of embodiments 1-6, further comprising configuring VM hardware of the replica VM after the replica OS disk is connected to the replica VM.

Embodiment 8. A method for performing any of the operations, methods, or processes, or any portion of any of these, disclosed herein.

Embodiment 9. A non-transitory storage medium having stored therein instructions that are executable by one or more hardware processors to perform the operations of any one or more of embodiments 1 through 8.

Embodiment 10. A system comprising one or more hardware processors, and the non-transitory storage medium of any of embodiments 1-9.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
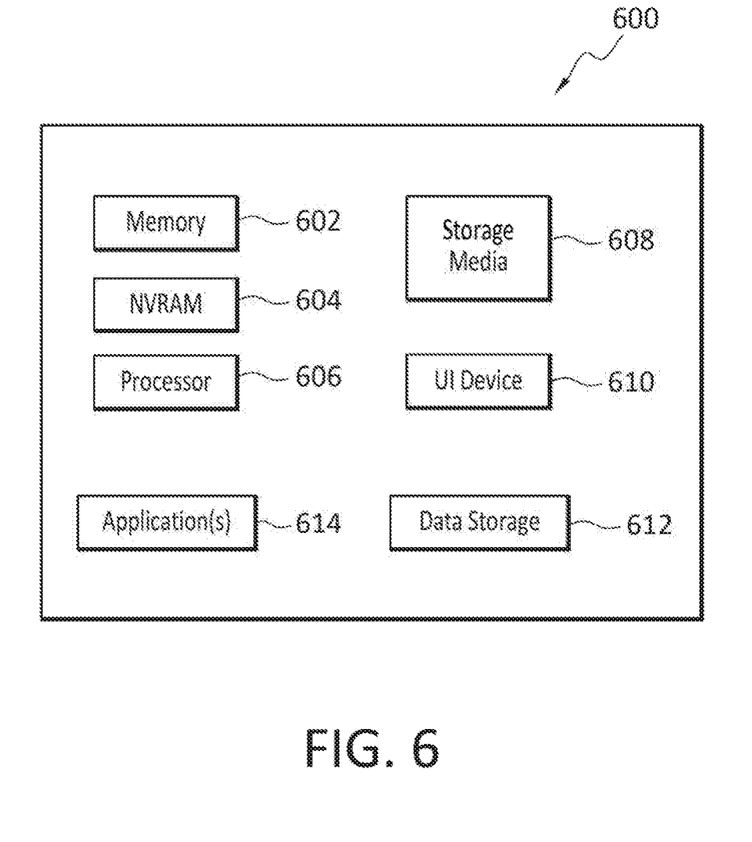
FIG. 6 discloses aspects of an example computing entity.

With reference briefly now to FIG. 6, any one or more of the entities disclosed, or implied, by FIGS. 1-5 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile random access memory (NVRAM) 604, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 602 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   as part of a planned failover procedure, performing operations comprising:
   connecting a replica OS disk to a replica VM;
   configuring VM hardware of the replica VM;
   powering up the replica VM;
   booting an OS of the replica VM;
   disconnecting a source VM from a network;
   flushing a buffer of the source VM, wherein the buffer includes an OS of the source VM;
   transferring leftover data from a volume of the source VM to a volume of the replica VM; and
   connecting replica data disks to the replica VM,
   wherein IOs issued by an application at the source VM continue to be processed by the source VM while the replica OS disk is connected, the replica VM is powered up, and the OS of the replica VM is booted.

2. The method as recited in claim 1, wherein processing of the IOs at the source VM stops when the source VM is disconnected from the network.

3. The method as recited in claim 1, wherein the operations further comprise, after booting the OS and before disconnecting the source VM, setting a new IP address and/or network configuration for the replica VM.

4. The method as recited in claim 1, wherein flushing the buffer occurs after disconnection of the source VM.

5. The method as recited in claim 1, wherein the operations further comprise, after disconnection of the source VM and before connecting the replica data disks to the replica VM, connecting the replica VM to the network.

6. The method as recited in claim 1, wherein the operations further comprise running the application at the replica VM after the replica data disks are connected to the replica VM.

7. A non-transitory storage medium having stored therein instructions that are executable by one or more hardware processors to perform operations comprising:
   connecting a replica OS disk to a replica VM;
   configuring VM hardware of the replica VM;
   powering up the replica VM;
   booting an OS of the replica VM;
   disconnecting a source VM from a network;
   flushing a buffer of the source VM, wherein the buffer includes an OS of the source VM;
   transferring leftover data from a volume of the source VM to a volume of the replica VM; and
   connecting replica data disks to the replica VM,
   wherein IOs issued by an application at the source VM continue to be processed by the source VM while the replica OS disk is connected, the replica VM is powered up, and the OS of the replica VM is booted, and wherein the operations are performed as part of a planned failover procedure.

8. The non-transitory storage medium as recited in claim 7, wherein processing of the IOs at the source VM stops when the source VM is disconnected from the network.

9. The non-transitory storage medium as recited in claim 7, wherein the operations further comprise, after booting the OS and before disconnecting the source VM, setting a new IP address and/or network configuration for the replica VM.

10. The non-transitory storage medium as recited in claim 7, wherein flushing the buffer occurs after disconnection of the source VM.

11. The non-transitory storage medium as recited in claim 7, wherein the operations further comprise, after disconnection of the source VM and before connecting the replica data disks to the replica VM, connecting the replica VM to the network.

12. The non-transitory storage medium as recited in claim 7, wherein the operations further comprise running the application at the replica VM after the replica data disks are connected to the replica VM.

13. A system, comprising:
   one or more hardware processors; and
   a non-transitory storage medium having stored therein instructions that are executable by the one or more hardware processors to perform operations comprising:
   connecting a replica OS disk to a replica VM;
   configuring VM hardware of the replica VM;
   powering up the replica VM;
   booting an OS of the replica VM;
   disconnecting a source VM from a network;
   flushing a buffer of the source VM, wherein the buffer includes an OS of the source VM;
   transferring leftover data from a volume of the source VM to a volume of the replica VM; and
   connecting replica data disks to the replica VM,
   wherein IOs issued by an application at the source VM continue to be processed by the source VM while the replica OS disk is connected, the replica VM is powered up, and the OS of the replica VM is booted, and wherein the operations are performed as part of a planned failover procedure.

14. The system as recited in claim 13, wherein processing of the IOs at the source VM stops when the source VM is disconnected from the network.

15. The system as recited in claim 13, wherein the operations further comprise, after booting the OS and before disconnecting the source VM, setting a new IP address and/or network configuration for the replica VM.

16. The system as recited in claim 13, wherein flushing the buffer occurs after disconnection of the source VM.

17. The system as recited in claim 13, wherein the operations further comprise, after disconnection of the source VM and before connecting the replica data disks to the replica VM, connecting the replica VM to the network.

18. The system as recited in claim 13, wherein the operations further comprise running the application at the replica VM after the replica data disks are connected to the replica VM.

* * * * *